US010783317B2

United States Patent
Arzuffi et al.

(10) Patent No.: US 10,783,317 B2
(45) Date of Patent: Sep. 22, 2020

(54) GENERATION OF COMBINED DOCUMENTS FROM CONTENT AND LAYOUT DOCUMENTS BASED ON SEMANTICALLY NEUTRAL ELEMENTS

(71) Applicant: International Business Machines Corporation, Armonk, NY (US)

(72) Inventors: Antonello Arzuffi, Segrate (IT); Davide Cosentino, Rome (IT); Remo Freddi, Rome (IT); Luigi Presti, Rome (IT); Michelangelo Serpico, Rome (IT); Antonio Zasa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/199,366

(22) Filed: Nov. 26, 2018

(65) Prior Publication Data

US 2019/0095407 A1    Mar. 28, 2019

Related U.S. Application Data

(63) Continuation of application No. 14/511,152, filed on Oct. 9, 2014, now Pat. No. 10,169,309.

(30) Foreign Application Priority Data

Oct. 10, 2013    (GB) .................................. 1317900.7

(51) Int. Cl.
| | | |
|---|---|---|
| *G06F 40/14* | (2020.01) | |
| *G06F 40/117* | (2020.01) | |
| *G06F 16/958* | (2019.01) | |

(52) U.S. Cl.
CPC ............ *G06F 40/14* (2020.01); *G06F 16/986* (2019.01); *G06F 40/117* (2020.01)

(58) Field of Classification Search
CPC ......................... G06F 17/218; G06F 17/30896
(Continued)

(56) References Cited

U.S. PATENT DOCUMENTS

| 8,020,092 B1 | 9/2011 | Spells et al. | |
|---|---|---|---|
| 2002/0004813 A1* | 1/2002 | Agrawal | G06F 17/30902 709/201 |

(Continued)

OTHER PUBLICATIONS

"Facelets—JavaServer Faces View Definition Framework"; Hookom, <http://facelets.java.net/nonav/docs/dev/docbook.html>, Published prior to: Feb. 21, 2011 (Year: 2011).*

(Continued)

*Primary Examiner* — Stephen S Hong
*Assistant Examiner* — Broderick C Anderson
(74) *Attorney, Agent, or Firm* — Yee & Associates, P.C.

(57) ABSTRACT

Managing markup documents having a definition conforming to a pre-defined specification by retrieving the definition of a content markup document, the definition including a set of one or more content portions enclosed within a content element of semantically neutral type having a content identifier, retrieving the definition of a layout markup document, the definition including a set of layout elements of semantically neutral type each one having a layout identifier, and generating the definition of a combined markup document from the definition of the layout markup document and the definition of the at least one content markup page, where generating the definition of a combined markup document includes inserting the content portion enclosed within each content element of the content markup document into the definition of the layout markup document in correspondence of each layout element with the layout identifier matching the content identifier of the content element.

19 Claims, 5 Drawing Sheets

(58) Field of Classification Search
USPC .......................................................... 715/234
See application file for complete search history.

(56) References Cited

U.S. PATENT DOCUMENTS

| | | | | |
|---|---|---|---|---|
| 2003/0154398 | A1* | 8/2003 | Eaton | G06Q 30/08 |
| | | | | 709/227 |
| 2006/0224948 | A1* | 10/2006 | Desmond | G06F 40/174 |
| | | | | 715/207 |
| 2009/0013244 | A1* | 1/2009 | Cudich | G06F 40/14 |
| | | | | 715/234 |
| 2012/0054596 | A1* | 3/2012 | Kroger | G06F 40/174 |
| | | | | 715/234 |
| 2012/0072826 | A1* | 3/2012 | Sherkin | G06F 16/345 |
| | | | | 715/234 |
| 2012/0254714 | A1 | 10/2012 | Peters et al. | |
| 2012/0254731 | A1* | 10/2012 | Peters | G06F 17/218 |
| | | | | 715/236 |
| 2012/0254733 | A1* | 10/2012 | Tucovic | G06F 40/106 |
| | | | | 715/243 |

OTHER PUBLICATIONS

"How Web Pages Work"; Marshall Brain; howstuffworks.com; <https://computer.howstuffworks.com/web-page1.htm>; Published prior to Oct. 4, 2003 (Year: 2003).*
"HTML <meta> Tag"; W3schools.com; <http://w3schools.com:80/tags/tag_meta.asp>; Published prior to Feb. 27, 2011 (Year: 2011).*
HTML <head> Tag; W3Schools.com; <https://www.w3schools.com/tags/tag_head.asp>; published prior to Mar. 5, 2010 (Year: 2010).*
"HTML <div> Tag"; W3schools.com; <https://www.w3schools.com/tags/tag_div.asp>; Published prior to Feb. 27, 2011 (Year: 2011).*
"Detecting Device and Browser"; WebPlatform, <http://docs.webplatform.org/wiki/concepts/Detecting_device_and_browser>, Published prior to: Oct. 19, 2012 (Year: 2012).*
"Smart Caching for Web Browsers"; Kaimin Zhang et al; Published Apr. 26-30, 2010 (Year: 2010).*
Rajkumar et al., "Dynamic web page segmentation based on detecting reappearance and layout of tag patterns for small screen devices (Abstract only)," 2012 International Conference on Recent Trends in Information Technology (ICRTIT), Apr. 2012, 1 page.
Hookom, "Facelets—JavaServer Faces View Definition Framework," Feb. 21, 2011, facelets.java.net, < http ://face lets .j ava.net/non av /docs/docbook. htm l#g etti ngstarted-vi ew-te mp late>.
"Detecting device and browser," Oct. 19, 2012, WebPlatform.org, <http://docs.webplatform.org/wiki/concepts/Detecting_device_and_browser>.
"Meta Tags," Mar. 8, 2010, Shire.net, <http://www.shire.net/learnwebdesign/metatags.htm>.
"HTML Attributes"; W3Schools; https://web.archive.org/web/20110227192308/http://w3schools.com:80/tags/tag_meta.asp; Published prior to Feb. 27, 2011.
"HTML <meta> Tag"; W3schools.com; <http://w3schools.com:80/tags/tag_meta.asp>; Published prior to Feb. 27, 2011.
("JavaServer Faces", Wikipedia, <http://en.wikipedia.org/wiki/JavaServer_Faces>; Feb. 1, 2013 (Year: 2013).
"Respository"; webopedia.com; <https://www.webopedia.com!TERM/R/repository.html>.

* cited by examiner

GENERATION OF COMBINED DOCUMENTS FROM CONTENT AND LAYOUT DOCUMENTS BASED ON SEMANTICALLY NEUTRAL ELEMENTS

CROSS-REFERENCE TO RELATED APPLICATION(S)

This application is a continuation of U.S. patent application Ser. No. 14/511,152, filing date Oct. 9, 2014, the entire contents of which are incorporated herein by reference.

DESCRIPTION

Technical Field

The present disclosure relates to the information technology field. More specifically, this disclosure relates to the generation of markup documents.

Background

Markup languages are commonly used to annotate documents with tags, which define instructions semantically distinguishable from their contents. One of the most popular markup languages is the HyperText Markup Language (HTML), which is used to define web pages. The web pages are hypertext documents (i.e., with hyperlinks providing direct access to other information resources, and particularly other web pages) that may be accessed in the Internet through the HyperText Transfer Protocol (HTTP); in this way, any user may navigate with his/her client through the web pages (organized into web sites on corresponding web servers) by means of a web browser, which allows retrieving, rendering and traversing the web pages.

Very often, the layout of the web pages needs to be manipulated. A typical example is when the web pages are re-designed to change their look-and-feel; another typical example is when the web pages are adapted for their display on different clients (for example, with a desktop version and a mobile version).

The layout of the web pages may be manipulated either on the client side or on the server side.

For example, on the clients it is possible to apply different Cascading Style Sheets (CSS) defining the presentation semantics of the web pages, to invoke the execution of javascripts programs acting on the layout of the web pages, or to implement HTML frames displaying contents independently of the rest of the web pages.

However, the manipulation of the web pages on the clients may involve complex operations on a Document Object Model (DOM) representation of the objects composing the web pages, and it may result in conflicts (so that it is generally of limited extent). Moreover, different browsers may involve different rendering of the same web pages because of incompatibly issues.

On the other hand, on the servers it is possible to use different technologies to create web pages dynamically, for example, the Active Server Pages (ASP) .NET, the JavaServer Pages (JSP), and the Hypertext Preprocessor (PHP). With reference in particular to the ASP.NET, it allows defining master pages (having placeholder controls) and content pages (each one bound to a specific master page by a corresponding directive and having content controls defining the content of a placeholder control mapped thereto); when the users request a specific content page, it merges with the corresponding master page to combine the layout of the master page with the contents from the content page. A similar technique is provided by tiles and templates in the JSP. Moreover, the same JSP and the PHP provide tags, which may be used to include HTML fragments into web pages.

However, the above-described techniques require the use of custom tags, so that they are completely tied to the corresponding technologies; therefore, they need very specialist skills, and they make it very hard for the migration to, and the co-operation with, other technologies. Moreover, the debug of the contents is difficult because they are not provided in self-consistent web pages, but they require the corresponding web pages defining their layout for the rendering. The application of these techniques to existing web sites is problematic, since it may require the re-writing of all their web pages individually and/or their re-engineering (for the insertion of the required custom tags); similar considerations apply to the re-use of mockup web sites. The same techniques may also involve performance degradation due to the processing of two web pages (for the content and the layout) before their merging. The web pages resulting from the merging may be actually composed of two or more web pages and then are not compliant with standard specifications, for example, of the World Wide Web Consortium (W3C).

Moreover, US-A-2012/054596 (the entire disclosure of which is herein incorporated by reference) describes the creation of a page by inserting one or more placeholders in the page, creating frames in the page based on received metadata at positions corresponding to the placeholders, and placing received content in the frames.

US-A-2012/0254731 (the entire disclosure of which is herein incorporated by reference) describes a form layout tool that configures a web configuration file with the location of form layout styles, and uses the form layout styles, a number of columns, a number of fields, and a size of each field to include in the component of a page layout to create a page layout for a combined application; the form layout tool generates a revised application page with the created page layout by applying the form layout style to the created page layout.

SUMMARY OF THE INVENTION

A simplified summary of the present disclosure is herein presented in order to provide a basic understanding thereof; however, the sole purpose of this summary is of introducing some concepts of the disclosure in a simplified form as a prelude to its following more detailed description, and it is not to be interpreted as an identification of its key elements nor as a delineation of its scope.

In general terms, the present disclosure is based on the idea of using elements of semantically neutral type to combine markup documents.

Particularly, one or more aspects of the present disclosure are set out in the independent claims and advantageous features thereof are set out in the dependent claims, with the wording of all the claims that is herein incorporated verbatim by reference (with any advantageous feature provided with reference to a specific aspect that applies mutatis mutandis to every other aspect).

More specifically, an aspect provides a method for managing markup documents, wherein a combined markup document is generated from one or more content markup documents (each one comprising one or more content portions each one enclosed within a content element of semantically neutral type) and a layout markup document (comprising one or more layout elements of semantically neutral type) according to a matching of these elements.

A further aspect provides a corresponding computer program (and a corresponding computer program product).

A further aspect provides a corresponding system.

BRIEF DESCRIPTION OF THE DRAWINGS

The solution of the present disclosure, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
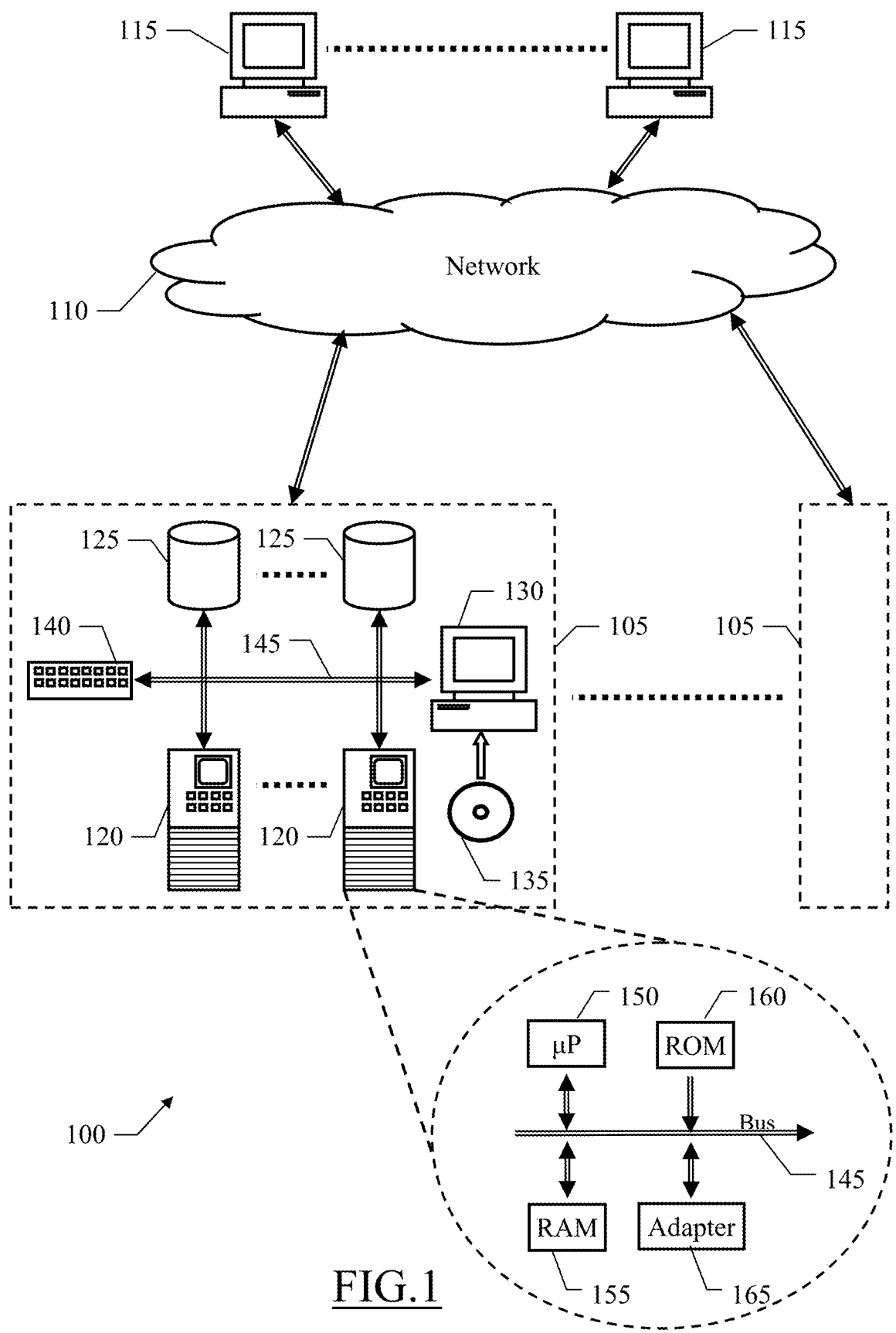
FIG. 1 shows a schematic block-diagram of a computing architecture wherein the solution according to an embodiment of the present disclosure may be applied.

With reference in particular to the FIG. 1, a schematic block-diagram is shown of a computing architecture 100 wherein the solution according to an embodiment of the present disclosure may be applied.

The computing architecture 100 is of the distributed type, commonly based on the Internet; the Internet is formed by millions of server computing machines (or simply servers), typically clustered in server farms 105, which are connected one to another through a global communication network 110. A subset of these servers are web servers, which host web sites each one comprising a collection of web pages connected one to another starting from a home page (as a whole known as World Wide Web (www), or simply web). Each web page is defined by a hypertext document (for example, formatted in the HTML language) which comprises one or more anchors (for example, text in underlined blue color or hand motif replacing a pointer) for corresponding hyperlinks (for example, providing direct access to other web pages); the web page is identified (for its access through the HTTP) by a corresponding Uniform Resource Identifier (URI), which consists of a unique string formatted according to a standard syntax. Users of client computing machines (or simply clients) 115 access the Internet, and in particular the web, through corresponding access providers (not shown in the figure).

A generic server farm 105 comprises several physical servers 120 implementing the web servers directly or via virtual machines hosted thereon (for example, of the rack or blade type) and several storage disks 125 (for example, of the RAID type) implementing mass-memories of the physical servers 120; the server farm 105 also comprises a console 130 for controlling the physical servers 120 and the disks 125 (for example, a personal computer, also provided with a drive for reading removable storage devices, such as DVDs 135). A switch/router sub-system 140 manages any communications among the physical servers 120, the disks 125 and the console 130, and with the network 110; for this purposes, the physical servers 120, the disks 125 and the console 130 are connected to the switch/router sub-system 140 through a cabling sub-system 145.

A generic physical server 120 is formed by several units that are connected in parallel to a bus structure 145. In detail, a set of one or more microprocessors (μP) 150 controls operation of the physical server 120; a RAM 155 is directly used as a working memory by the microprocessors 150, and a ROM 160 stores basic code for a bootstrap of the physical server 120. Moreover, the physical server 120 comprises a network adapter 165, which is used to connect the physical server 120 to the cabling sub-system 145.

Figure 2:
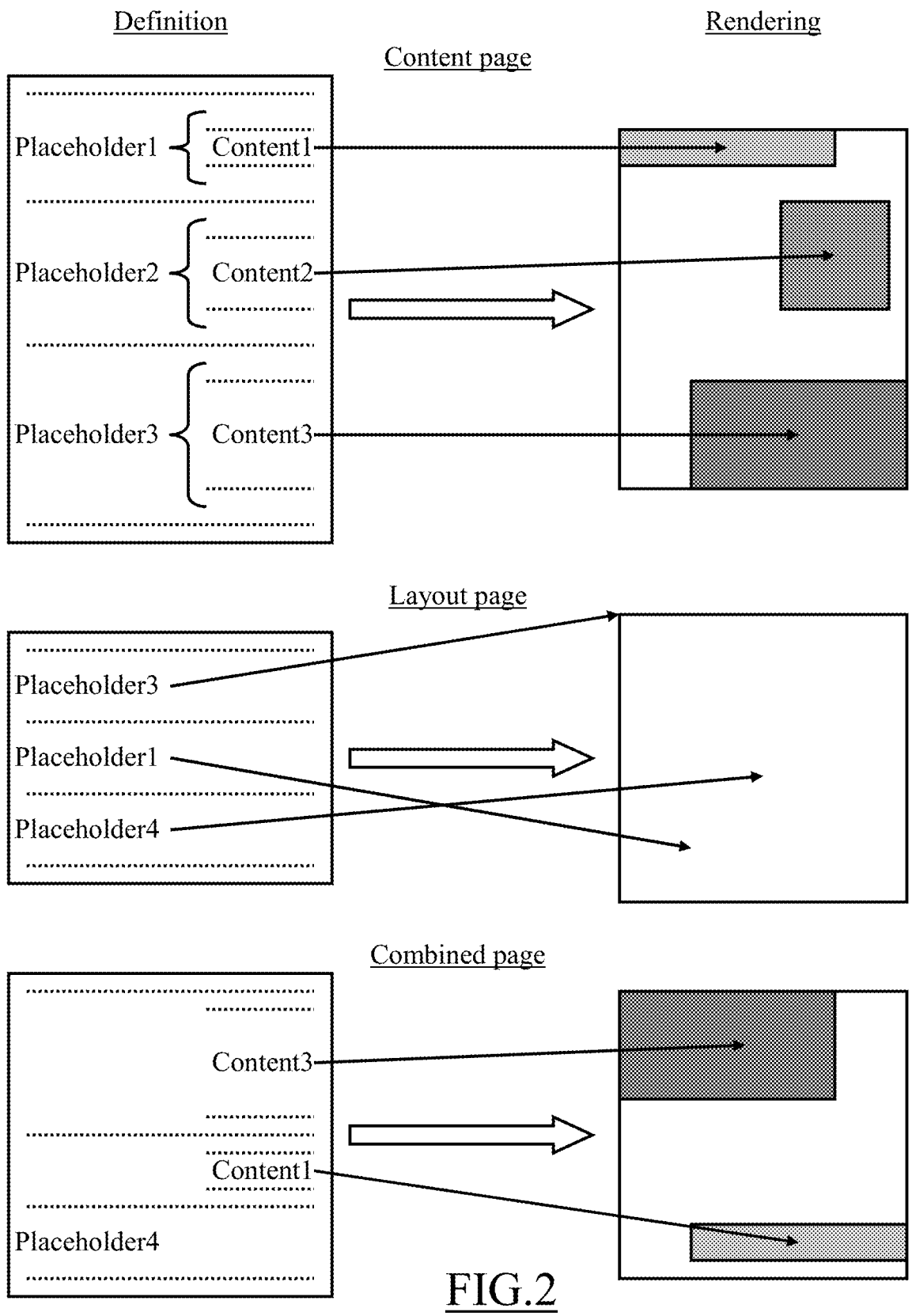
FIG. 2 shows a pictorial representation of an exemplary application of the solution according to an embodiment of the present disclosure.

With reference now to the FIG. 2, a pictorial representation is shown of an exemplary application of the solution according to an embodiment of the present disclosure.

A web page, referred to as content page, is used to provide content information. The definition of the content page conforms to a pre-defined specification (for example, the HTML). This means that the definition of the content page provides a valid web page, which may be correctly interpreted for its rendering (or at least it may be corrected for this purpose). The definition of the content page (an HTML file in the example at issue) comprises one or more content portions (three content portions Content1, Content2 and Content3 in the example at issue), which are rendered in corresponding locations of the content page according to its definition. Each content portion is enclosed within an element of semantically neutral type, referred to as content element (the content elements Placeholder1, Placeholder2 and Placeholder3, respectively, in the example at issue); each content element has an identifier, referred to as content identifier (for example, defined by an attribute thereof). Generally, a semantically neutral element (for example, the div element in the HTML) is an element that does not add any meaning to its content by itself; for example, the semantically neutral element alone does not provide any contribution to the rendering or to the properties of the web pages (so that it is opaque thereto). The semantically neutral elements differ from the other elements of semantically meaningful type, which instead add meaning to their content by themselves (for example, by contributing alone to define the rendering or the properties of the web pages). Therefore, the content elements only serve to identify the content portions (even if they are opaque to the content page by themselves, and particularly to its rendering and properties).

Another web page, referred to as layout page, is used to provide layout information. The definition of the layout page as well conforms to a pre-defined specification (for example, again the HTML). The definition of the layout page (another HTML file in the example at issue) comprises one or more elements again of semantically neutral type, referred to as layout elements (the layout elements Placeholder3, Placeholder1 and Placeholder4 in the example at issue); in this case as well, each layout element has an identifier, referred to as layout identifier (for example, defined by an attribute thereof). The layout elements define placeholders for corresponding positions in the layout page (even if they are opaque to the layout page by themselves, and particularly to its rendering and properties).

A new web page, referred to as combined page, is generated by combining the content page (or more) and the layout page. More specifically, the definition of the combined page is generated starting from the definition of the layout page; the content portion enclosed within each content element of the content page is inserted into the definition of the layout page, in correspondence of each layout element with the layout identifier that matches the content identifier of the content element. In the example at issue, the content portion Content3 enclosed within the content element Placeholder3 and the content portion Content1 enclosed within the content element Placeholder1 (from the definition of the content page) are inserted in place of the layout elements Placeholder3 and Placeholder1, respectively (in the definition of the layout page). As a result, the combined page will have the layout defined by the layout page, with the content portions Content3 and Content1 provided by the content page that are rendered in the locations defined by the corresponding layout elements Placeholder3 and Placeholder1, respectively. Conversely, the other portions of the content page not being enclosed within any content element and the content portion Content2 being enclosed within the content element Placehold2 that has no matching layout element in the definition of the layout page remain unused; vice-versa, the position defined by the layout element Placeholder4 in the definition of the layout page remains empty, since it has no matching content element in the definition of the content page.

The above-described solution may be applied to any technologies, either on the client side or on the server side.

This solution is very simple and safe, and it does not involve any incompatibility issues.

The desired result is achieved without the use of any custom tag (so that it is not tied to any specific technology); therefore, the application of the solution does not require any specialist skills. For example, web and graphic designers may create the layout pages by themselves or re-use existing templates (whereas web developers may create the content pages). The solution does not hinder at all the migration to and the co-operation with other technologies.

Moreover, the debug of the contents is facilitated, since the content pages are self-consistent (without the need of the layout pages for their rendering), so that they may be tested stand-alone.

The solution may be applied to existing content pages (for example, in existing web sites) in a very easy way; particularly, the existing content pages may remain in use (for example, in a production environment) while the manipulation of their layout is in progress (since the operation is completely opaque to their rendering). Likewise, this strongly facilitates the use of mockup applications.

The solution does not involve any significant performance degradation.

The combined pages maintain the properties of the layout pages; particularly, if the layout pages and the content portions are compliant with standard specifications (for example, the W3C) the combined pages will be compliant thereto as well.

For example, with particular reference to the HTML specification, the definition of each web page is composed of HTML elements with predefined names; each HTML element is defined by one or two tags with the same name; particularly, an empty element is defined by a single tag in the form <name/>, whereas an element with content is defined by a start tag in the form <name> and an end tag in the form </name> that enclose the content. The element may also have one or more attributes, each one with a corresponding name and value in the form name="value" within its single/start tag. The web page starts with an element declaring the type of HTML document (<!DOCTYPE . . . >) followed by a html element (<html> . . . </html>); the html element comprises a head element (<head> . . . </head>) that defines a header providing information about the web page different from its content (for example, title and search keywords), and a body element (<body> . . . </body>) that defines the actual content of the web page.

In the solution according to an embodiment of the present disclosure, non-empty div elements (each one with a start div tag and an end div tag) are used to enclose the content portions in the body of the content page, and empty div elements (each one with a single div tag) are used to define the placeholders in the body of the layout page. The div element is a semantically neutral element, which may be used to define a division in the web page (when it is empty) or to group a block of elements thereof (otherwise), but without adding any meaning by itself; for example, the div element may be used to select a portion of the web page for the application of a specific CSS. In the solution according to an embodiment of the present disclosure, each div element is further provided (both in the content page and in the layout page) with an id attribute, whose value defines its identifier. Particularly, each content portion of the content page is enclosed within a <div id="myID"> start tag (wherein myID is any alphanumeric value) and a </div> end tag, whereas each placeholder of the layout page is defined by a <div id="myID"/> tag.

In order to generate the definition of each combined page, the content portion enclosed within each div element of the content page (i.e., after its start tag and before its end tag) is inserted into the definition of the layout page, before each div element with the same value of the id attribute; in this way, when the content page comprises two or more content portions enclosed within div elements with the same value of their id attributes, these content portions are appended before the corresponding div element of the layout page, according to their order in the content page.

The id attributes of the div elements of the layout page may have unique values therein; this ensures that the value of the id attribute of each div element in the content page is equal at most to the id value of a single div element of the layout page, so as to prevent any duplication of the corresponding content portion in the combined page. Conversely, two or more div elements of the layout page may have the same value of their id attributes when it is desired to replicate the same content portion, enclosed within each div element of the content page having the same value of the id attribute, in the combined page (for example, for advertisement messages). Nevertheless, the two or more div elements of the layout page, having the same value of their id attribute, may have different presentation layers in order to render the same content portion in different manners (e.g., with different CSSs). In this case, it would be preferable to use a different attribute that is not unique as the id attribute is (in order to preserve the W3C compliance). For example, it is possible to use a custom data attribute (such as the data-id attribute); generally, the custom data attributes are attributes supported by the HTML5 (with names formed by at least one character prefixed by the string data-), which are used to store private data that is not intended for use by other applications.

As a further improvement, the placeholder elements (of the layout page) may not even be empty and they may contain a default content (e.g., enclosed within their div start tag and div end tag) to be used in case the content page does not provide any corresponding content portion.

Preferably, in the combined page the div elements (being used in the layout page to define the placeholders) are removed; this avoids maintaining useless elements in the combined page that are not used any longer, so as to reduce its size (and then a bandwidth occupation for the transmission of the combined page to the corresponding client).

The content page may be identified by a meta element in its header. Generally, the meta element is used to provide metadata (i.e., data about the data of the web page, such as its author, description, last modification), in the form of a name attribute (defining the type of data) and a content attribute (defining the value of the data). In the solution according to an embodiment of the present disclosure, the content page comprises a meta element with a pre-defined value of the name attribute, such as layout-page. The same meta element may also be used to identify the layout page (for example, "myLayoutPage") that is associated with the content page in its content attribute (i.e., <meta name="layout-page" content="myLayoutPage"/>); conversely, the content attribute may be left empty when the layout page is determined at run-time (i.e., <meta name="layout-page" content=" "/>). As above, the meta element with the attribute name="layout-page" is preferably removed from the combined page.

In addition, sometimes it may be desirable to insert content portions of the content page contained in its header (i.e., providing information about it) in the layout page. However, the above-described technique is not applicable, since the div elements may only appear in the body; however, the same result may be achieved with the use of other elements in a similar way.

Particularly, it is possible to use meta elements to enclose the content portions (in the header of the content page) and to define the placeholders (in the header of the layout page). For example, two meta elements with different pre-defined values of the name attributes, such as contentStart and contentEnd, may be used to enclose each content portion; a meta element with another pre-defined value of the name attribute, such as placeholder, may be used to define each placeholder. The values of the content attributes of these meta elements (both in the content page and in the layout page) are instead used to define their identifiers (i.e., <meta name="contentStart" content="myID"/> and <meta name="contentEnd" content="myID"/> in the content page, and <meta name="placeholder" content="myID"/> in the layout page).

In addition or in the alternative, when the content portions are single elements supporting an attribute that may be used to define an identifier thereof, it is possible to define corresponding placeholders in the header of the layout page with the same elements having the same identifiers. An example is the link element, which is used to specify a relationship with an external resource; the link element is always empty (<link . . . />), and it may have one or more specific attributes defining corresponding characteristics of the external resource (for example, a rel attribute for the type of relationship and a href attribute for the Uniform Resource Location, or URL, of the external resource). In the solution according to an embodiment of the present disclosure, the link element is provided (both in the content page and in the layout page) with an id attribute, whose value defines its identifier as above (<link . . . id="myID"/>).

For example, a content page PageC1 (in the following, labels starting with myCode will be used to denoted generic pieces of code):

```
<!DOCTYPE ...>
<html>
<head>
<meta name="layout-page" content="PageL1">
<link id="ID1" myCodeC1a/>
</head>
<body>
<div id="ID2">
myCodeC1b
</div>
myCodeC1c
<div id="ID3">
myCodeC1d
</div>
</body>
</html>
``` is combined with a layout page PageL1:

```
<!DOCTYPE ...>
<html>
<head>
myCodeL1a
<link id="ID1" myCodeL1b/>
</head>
<body>
<div id="ID4">
myCodeL1c
<div/>
myCodeL1d
<div id="ID3"/>
</body>
</html>
``` so as to obtain the following combined page:

```
<!DOCTYPE ...>
<html>
<head>
myCodeL1a
<link id="ID1" myCodeC1a/>
</head>
<body>
myCodeL1c
myCodeL1d
myCodeC1d
</body>
</html>.
```

Another content page PageC2 (with the identifier of each content element thereof now defined by the value of the data-id attribute):

```
<!DOCTYPE ...>
<html>
<head>
<meta name="layout-page" content="">
<meta name="contentStart" content="ID5">
myCodeC2a
<meta name="contentEnd" content="ID5">
</head>
<body>
<div data-id="ID4">
myCodeC2b
</div>
<div data-id="ID4">
myCodeC2c
</div>
<div data-id="ID6">
myCodeC2d
</div>
</body>
</html>
``` may be combined with the same layout page PageL1 (associated thereto at run-time), so as to obtain the following combined page:

```
<!DOCTYPE ...>
<html>
<head>
myCodeL1a
<link id="ID1" myCodeL1b/>
</head>
<body>
myCodeC2b
myCodeC2c
myCodeL1d
</body>
</html>.
```

On the other hand, the same content page PageC2 may be combined with another layout page PageL2 (associated thereto at run-time):

```
<!DOCTYPE ...>
<html>
<head>
<meta name="placeholder" content="ID5">
</head>
<body>
<div id="ID6"/>
myCodeL2a
</body>
</html>
``` so as to obtain the following combined page:

```
<!DOCTYPE ...>
<html>
<head>
myCodeC2a
</head>
<body>
myCodeC2d
myCodeL2a
</body>
</html>.
```

Figure 3:
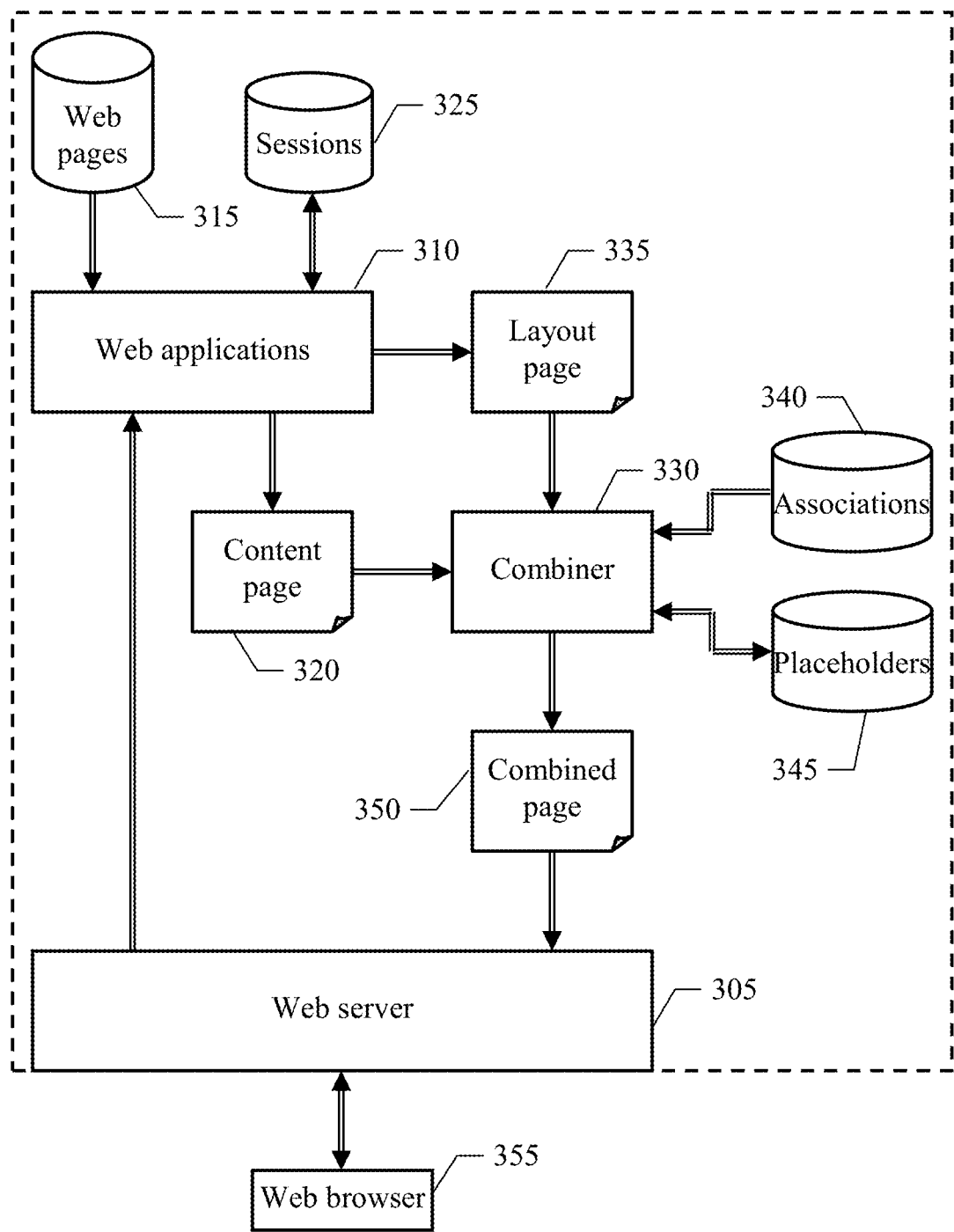
FIG. 3 shows the main software components that may be used to implement the solution according to an embodiment of the present disclosure.

With reference now to the FIG. 3, the main software components are shown that may be used to implement the solution according to an embodiment of the present disclosure.

Particularly, all the software components (programs and data) are typically stored in the mass memory and loaded (at least partially) into the working memory of each (server or client) computing machine when the programs are running. The programs are initially installed onto the mass memory, for example, from removable storage devices or from the network. In this respect, each software component may represent a module, segment or portion of code, which comprises one or more executable instructions for implementing the specified logical function.

A generic web server runs a software application 305, referred to with the same name, which processes any requests submitted by the users for accessing one or more web sites hosted thereon. For this purpose, the web server 305 dispatches the requests to corresponding web applications 310. Each web application 310 serves its requests by returning corresponding results; generally, the results are web pages of the web site whose downloading has been requested by the users; the web pages may be either static (when their definition is pre-defined) or dynamic (when their definition is generated at run-time, for example, leveraging the ASP.NET, JSP or PHP technologies). For this purpose, the web application 310 accesses a web page repository 315 storing the relevant information of all the web pages of the web site. Particularly, in the context of the present disclosure the web application 310 returns the (HTML) definition of a content page, denoted with the reference 320, in response to each corresponding request. The web application 310 may also control a session repository 325, which stores information about any active sessions with the users (for example, their types, such as administrator or end-user, and authorizations); this session information is used to implement stateful transactions with the users (for example, by means of unique session identifiers that are provided in hidden variables of the web pages, in cookies stored in their clients or in query strings of the requests), despite the stateless nature of the HTTP (which instead treats every request independently of any previous one).

In the solution according to an embodiment of the present disclosure, the web server further runs a combiner 330. The combiner 330 receives the definition of each content page 320 returned by the corresponding web application 310; for example, the combiner 330 may be implemented as a filter of a web container that manages JSPs (by interfacing with an underlying software environment). The combiner 330 interacts with the web application 310 to retrieve the (HTML) definition of the layout page associated with the content page 320, denoted with the reference 335. The layout page 335 associated with the content page 320 may be either indicated in the definition of the content page 320 or it may be determined at run-time. In the latter case, the combiner 330 further receives information about the corresponding request or about the corresponding session from the web application 310; the combiner further accesses an association repository 340, which associates each content page with one or more layout pages for different characteristic information of the clients (for example, their type, such as desktop or mobile device, operating system, software vendor, software level) and/or characteristic information of the sessions (for example, user's type and authorizations). The combiner 330 may also control a placeholder repository 345, which stores a list of the placeholders of each layout page.

In any case, the combiner 330 generates, from the definition of the layout page 335 and the definition of the content page 320, the definition of the corresponding combined page, denoted with the reference 350. The combiner 330 returns the definition of the combined page 350 to the web server 305 for its downloading onto the client in response to the corresponding request.

Moving now to a generic client, it runs a web browser 355, which is used by its user to navigate through the Internet. Particularly, in the context of the present disclosure the web browser 355 is used to submit requests for downloading selected web pages, to receive the corresponding responses (i.e., the corresponding combined pages), and to render them for their display on the client.

Figure 4A:
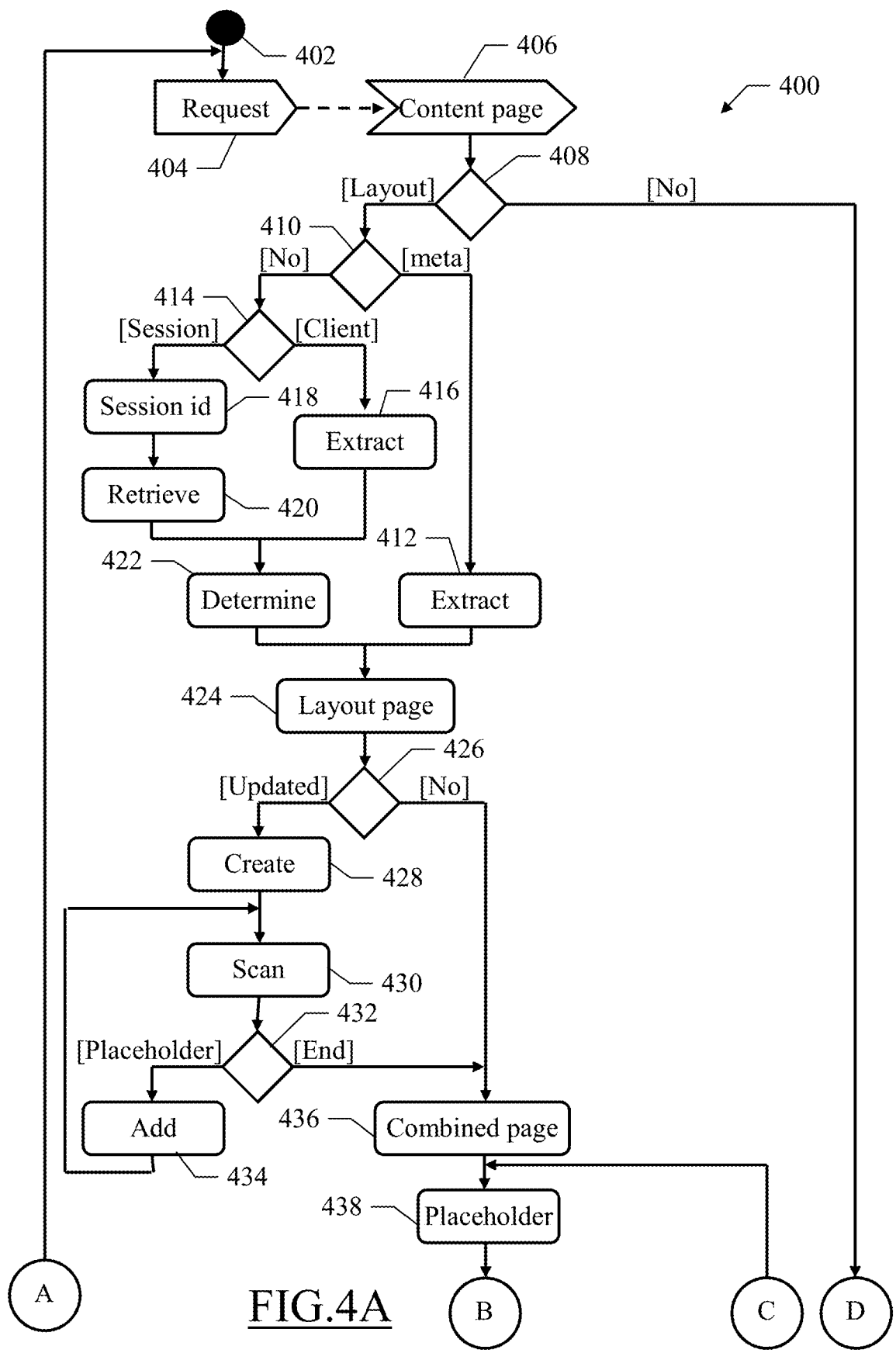
FIG. 4A-FIG. 4B show an activity diagram describing the flow of activities relating to an implementation of the solution according to an embodiment of the present disclosure.
Figure 4B:
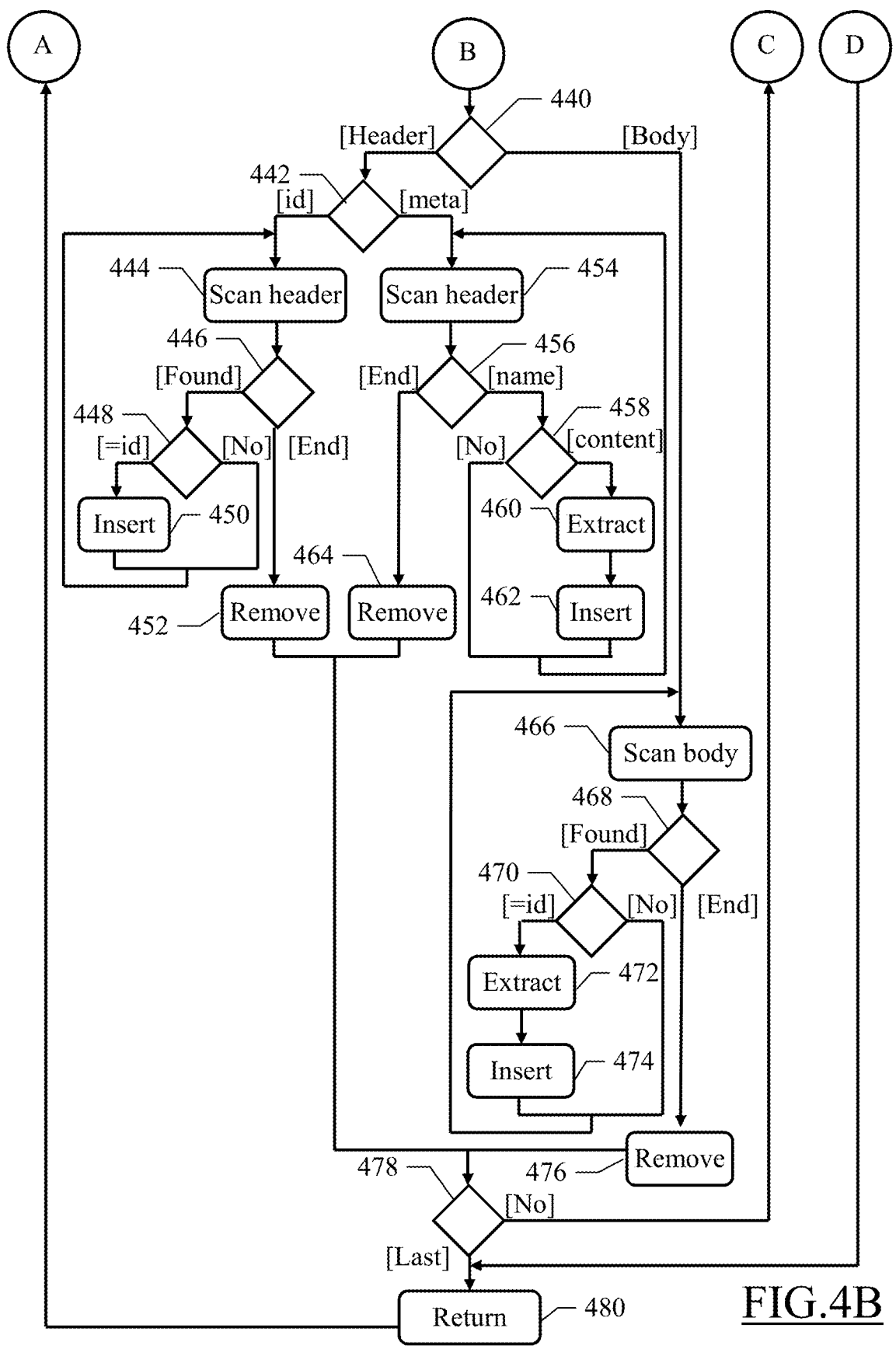

With reference now to the FIG. 4A-FIG. 4B, an activity diagram is shown describing the flow of activities relating to an implementation of the solution according to an embodiment of the present disclosure.

Particularly, the activity diagram represents an exemplary process that may be implemented on a generic web server with a method 400. In this respect, each block may represent one or more executable instructions for implementing the specified logical function on the server.

The method 400 begins at the black start circle 402 and then it passes to block 404 as soon as a request for downloading a selected web page is received from the web browser of any client. Particularly, the request is a HTTP request comprising a request line for the execution of a get method on the URI of the web page; the HTTP request also comprises a User-agent field specifying characteristics of the client originating the HTTP request (for example, its type such as desktop or mobile device, operating system, software vendor, software level).

In response thereto, the (HTML) definition of the web page is retrieved at block 406 as usual (for example, by simply reading it for static web pages or generating it at run-time for dynamic web pages). A test is made at block 408 to verify whether the web page is a content page to be processed according to the present disclosure (i.e., it comprises a meta element with the name="layout-page" in its header). If so, a further test is performed at block 410 to verify whether the layout page associated with the content page is indicated in the content attribute of this meta element. If the content attribute is not empty, the name of the layout page is extracted from its value at block 412. Conversely (i.e., if the layout page has to be determined at run-time), the flow of activity branches at block 414 according to a configuration of the combiner. If the combiner is configured for determining the layout page according to characteristic information of the client originating the HTTP request, this characteristic information is extracted at block 416 from the HTTP request (for example, from its User-agent field). Conversely, a session identifier is extracted from the HTTP request at block 418; for example, the session identifier is generated by the corresponding web application at a login of the user and it is sent to its client as a cookie with a pre-defined name (so as to be stored in its web browser), which session identifier is then returned to the web server as the value of a corresponding field in the HTTP request. The session identifier is used at block 420 to retrieve characteristic information of the session from the corresponding repository. In any case, the flow of activity merges again at block 422 from either the block 416 or the block 420. At this point, the layout page associated with the content page is determined according to the characteristic information of the client and/or the session (from the corresponding repository); for example, it is possible to associate different layout pages to the same content page in the first case for desktop devices and mobile devices, and in the second case for administrators and end-users. The flow of activities then merges at block 424 from either the block 412 or the block 422, wherein the definition of the layout page so determined is retrieved as usual (again, by simply reading it for static web pages or generating it at run-time for dynamic web pages).

The process now branches at block 426 according to the status of the layout page. Particularly, if the definition of the layout page has been updated since a last use thereof (i.e., when the layout page is dynamic or when the layout page is static but it has been replaced as indicated by an associated flag being asserted), at block 428 a new entry for the layout page is created in the placeholder repository (deleting any previous version thereof). The definition of the layout page is scanned at block 430 starting from the beginning of the header (<head> tag) in order to search its potential placeholders (i.e., any HTML element with the id attribute or any meta element with the attribute name="placeholder" in the header, or any div element with the id attribute in the body). The process branches at block 432 according to a result of this search. If a placeholder has been found, the corresponding HTML element is added to the entry of the layout page in the placeholder repository; the process then returns to the block 430 to continue the search of the placeholders (starting from the last one being found). Conversely, when the end of the body (</body> tag) has been reached, the process descends into block 436; the same point is also reached directly from the block 426 when the definition of the layout page has not been updated since the last use thereof (corresponding flag being deasserted), so that its entry in the placeholder repository is still valid. In this way, it is possible to limit the scanning of the layout pages (down to a single one for the whole life-cycle of the web site), so as to reduce the corresponding overhead in the generation of the combined pages.

At this point, the definition of the combined page (to be generated by combining the content page with the layout page) is initialized by copying the definition of the layout page (with the exception of the meta element with the name="layout-page" in its header); in this way, any pieces of code of the layout page (contributing to define either its property in the header or its content in the body) are always comprised in the definition of the combined page as fixed portions thereof (independently of the content page). A loop is then performed for processing the entry of the layout page in the placeholder repository; particularly, a (current) placeholder thereof, starting from the first one, is retrieved at block 438. The process then branches at block 440 according to the type of the placeholder. Particularly, if the placeholder relates to the header (i.e., it is an HTML element with the id attribute or a meta element with the attribute name="placeholder"), the process further branches at block 442 according to the specific type of the placeholder.

Particularly, if the placeholder is an HTML element with the id attribute (for example, a link element), the definition of the content page is scanned at block 444 starting from the beginning of the header (<head> tag) in order to search any HTML elements with the same name and the id attribute (the <link id="myID" . . . /> elements in the example at issue). The process branches at block 446 according to a result of this search. If this HTML element has been found, a test is made at block 448 to verify its id attribute. If the value of the id attribute of the HTML element in the content page is the same as the value of the id attribute of the placeholder, at block 450 the HTML element of the content page is inserted into the header of the combined page, before the same placeholder. The process then returns to the block 444 to continue the search of the HTML elements (starting from the last one being found); the same point is also reached from the block 448 when the value of the id attribute of the HTML element in the content page is different from the value of the id attribute of the placeholder. Referring back to the block 446, when the end of the header (</header> tag) has been reached, the process descends into block 452; in this phase, the placeholder is removed from the definition of the layout page.

With reference again to the block 442, if the placeholder is a meta element with the attribute name="placeholder", the definition of the content page is scanned at block 454 starting from the beginning of the header (<head> tag) in order to search any meta elements with the attribute name="contentStart" (<meta name="contentStart" content="myID"/>). The process branches at block 456 according to a result of this search. If this meta element has been found, a test is made at block 458 to verify its content attribute. If the value of the content attribute of the meta element in the content page is the same as the value of the content attribute of the placeholder, the content portion in the definition of the content page enclosed within this meta element and the paired meta element with the attribute name="contentEnd" (<meta name="contentEnd" content="myID"/>) and the same value of the content attribute is extracted at block 460. Continuing to block 462, this content portion is then inserted into the header of the combined page, before the same placeholder. The process then returns to the block 454 to continue the search of the meta elements (starting from the last one being found); the same point is also reached from the block 458 when the value of the content attribute of the meta element in the content page is different from the value of the content attribute of the placeholder. Referring back to the block 456, when the end of the header (</header> tag) has been reached, the process descends into block 464; in this phase, the placeholder is removed from the definition of the layout page.

Returning to the block 440, when the placeholder relates to the body (i.e., it is a div element with the id attribute), the definition of the content page is scanned at block 466 starting from the beginning of the body (<body> tag) in order to search any div start tag with the id attribute (<div id="myID">). The process branches at block 468 according to a result of this search. If this div start tag has been found, a test is made at block 470 to verify its id attribute. If the value of the id attribute of the div start tag in the content page is the same as the value of the id attribute of the placeholder, the content portion in the definition of the content page enclosed within the div start tag and the corresponding div end tag (<div/>) is extracted at block 472. Continuing to block 474, this content portion (defining actual content and/or local layout) is then inserted into the body of the combined page, before the same placeholder. The process then returns to the block 466 to continue the search of the div start tags (starting from the last one being found); the same point is also reached from the block 470 when the value of the id attribute of the div start tag in the content page is different from the value of the id attribute of the placeholder. Referring back to the block 468, when the end of the body (</body> tag) has been reached, the process descends into block 476 In this phase, the placeholder is removed from the definition of the layout page; particularly, the removal involves the whole placeholder together with any content thereof when one or more content portions from the content page have been inserted in the definition of the combined page (for example, as indicated by a corresponding flag), whereas the removal involves the tag(s) only of the placeholder so as to maintain any default content thereof in the definition of the combined page otherwise. The flow of activity merges at block 478 from the block 452, from the block 464 or from the block 476. At this point, a test is made to verify whether a last placeholder of the layout page has been processed. If not, the process returns to the block 438 to reiterate the same operations on a next placeholder of the layout page. Conversely (once the whole entry of the layout page in the placeholder repository has been processed), the loop is exit by descending into block 480; the same point is also reached directly from the block 408 when the web page is a standard page that is not to be processed according to the present disclosure (i.e., it does not comprise any meta element with the name="layout-page" in its header). In this phase, the definition of the web page so obtained (i.e., the combined page or the standard page) is returned to the client as a response to its HTTP request (so as to cause its rendering in the web browser). The process goes back to the block 404, waiting for a next HTTP request.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, an embodiment provides a method for managing markup documents, each one having a definition conforming to a pre-defined specification. The method comprises the following steps. The definition of at least one content markup document is retrieved; the definition of each content markup document comprises a set of one or more content portions, each one enclosed within a content element of semantically neutral type having a content identifier. The definition of a layout markup document is retrieved; the definition of the layout markup document comprises a set of one or more layout elements of semantically neutral type, each one having a layout identifier. The definition of a combined markup document is generated from the definition of the layout markup document and the definition of said at least one content markup page; said generating the definition of a combined markup document comprises inserting the content portion enclosed within each content element of said at least one content markup document into the definition of the layout markup document in correspondence of each layout element with the layout identifier matching the content identifier of the content element.

However, the content markup document(s) and the layout markup document may be of any type (see below) and their definitions may conform to any specification, even different to each other (for example, WML). The definitions of the (content and layout) markup documents may be retrieved in any way (for example, either statically or dynamically according to any technology, such as SAP). The content elements and the layout elements may be of any semantically neutral type, and the content identifiers and the layout identifiers may be of any type (see below). The definition of the combined markup document may be generated in any way (for example, discarding any content of the layout markup document); moreover, the match of the content identifiers with the layout identifiers may be established in any way (for example, when they simply have common portions) and the content portions may be inserted into the definition of the combined markup document in any way (for example, either before or after the corresponding layout elements, which may be either removed or maintained in the combined markup document).

In an embodiment, each markup document is a web page.

However, the same technique may be applied more generally to any markup documents (for example, text documents written in the LaTeX language).

In an embodiment, each content element comprises a start container tag (having an attribute whose value defines the content identifier) and an end container tag; each layout element is a container element, which has an attribute whose value defines the layout identifier.

However, the start/end container tag and the container element (being either empty or not) may be of any type, even different to each other (for example, span tags). Likewise, the attributes defining the container identifier and the layout identifier may be of any type, even different to each other (for example, name attributes); moreover, the content identifier of each content element may be provided in any position (i.e., only in the start container tag, only in the end container tag or in both of them).

In an embodiment, each content element comprises a metadata element for a start thereof (having a first attribute with a pre-defined start value and a second attribute whose value defines the content identifier) and a metadata element for an end thereof (having a first attribute with a pre-defined end value); each layout element is a metadata element, which has a first attribute with a pre-defined layout value and a second attribute whose value defines the layout identifier.

However, the metadata elements may be identified by any pre-defined values of any attributes thereof, even different to each other. Likewise, the attributes defining the content identifier and the layout identifier may be of any type, even different to each other; moreover, as above the content identifier of each content element may be provided in any position (i.e., only in the start metadata element, only in the end metadata element or in both of them).

In any case, the different elements of semantically neutral type may be applied to any portion of the markup pages, and their use may be combined in any way (for example, by using the container elements only, the metadata elements only or both of them in the content markup page(s) and/or in the layout markup page); in any case, the content elements and the layout elements may be implemented with any other standard tags (of the specification) that have no meaning by themselves.

In an embodiment, said inserting the content portion enclosed within each content element comprises, for at least one of the layout elements having a plurality of content elements with the content identifier matching the layout identifier of the layout element: appending the content portions enclosed within the content elements according to an order of the content elements within said at least one content markup document.

However, the content portions may be treated in any other way (for example, only allowing a single content portion for each layout element).

In an embodiment, the definition of each content markup document comprises a set of one or more further content elements of semantically meaningful type each one having a further content identifier, and the definition of each layout markup document comprises a set of one or more further layout elements of semantically meaningful type each one having a further layout identifier; said generating the definition of a combined markup document comprises inserting each further content element of said at least one content markup document into the definition of the layout markup document in correspondence of each further layout element of the same type with the further layout identifier matching the further content identifier of the further content element.

However, the further content elements and the further layout elements may be of any semantically meaningful type (for example, footer elements). Likewise, the further content identifiers and the further layout identifiers may be of any type (for example, defined by the values of any attributes of the further content elements and the further layout elements, respectively, even different to each other); as above, their match may be established in any way (for example, when they simply have common portions) and the further content elements may be inserted into the definition of the combined markup document in any way, even maintaining the corresponding further layout elements in the combined markup document (either always or only when no matching further content element has been found). In any case, this feature may be omitted (with the same result that may be obtained by using the above-mentioned content elements and/or layout elements).

In an embodiment, said at least one content markup document is a single content markup document; said retrieving the definition of at least one content markup document, said retrieving the definition of a layout markup document and said generating the definition of a combined markup document are performed in response to a request of the content markup document from an agent. The method further comprises returning the combined markup page to the agent in response to the request of the content markup document.

However, any number of content markup documents may be associated with the layout markup document; moreover, the combined markup document may be generated in response to any request (for example, a request of the layout markup document when multiple content markup documents are associated thereto) that may be received from any agent (for example, a web spider or a Braille web browser).

In an embodiment, said retrieving the definition of a layout markup document comprises extracting an indication of the layout markup document from the definition of the content markup document.

However, the indication of the layout markup document may be extracted in any way from the definition of content markup document (see below).

In an embodiment, said extracting an indication of the layout markup document from the definition of the content markup document comprises extracting the indication of the layout markup document from a metadata element, which has a first attribute with a pre-defined association value and a second attribute whose value indicates the layout markup document.

However, the association tag may be identified by any pre-defined value of any attribute thereof and the layout markup document may be indicated by the value of any attribute thereof; in any case, the layout markup document may be indicated in any other element (for example, again in an element of semantically neutral type).

In an embodiment, said retrieving the definition of a layout markup document comprises determining the layout markup document according to the request of the content markup document.

However, the layout markup document may be determined in any way from the request of the content markup document (see below).

In an embodiment, said determining the layout markup document comprises extracting an indication of characteristic information of the agent from the request of the content markup document, and determining the layout markup document according to the characteristic information of the agent.

However, the characteristic information of the agent may be of any type (for example, its geographical location), and it may be extracted from the request in any way (for example, from any number and type of fields thereof); moreover, the layout markup document may be determined in any way according to the characteristic information of the agent (for example, from a database, an XML file or a property file).

In an embodiment, said determining the layout markup document comprises retrieving an indication of characteristic information of a session associated with the request of the content markup document, and determining the layout markup document according to the characteristic information of the session.

However, the characteristic information of the session may be of any type (for example, for anonymous users or registered users), and it may be retrieved in any way (for example, by using a stateful protocol); moreover, the layout markup document may be determined in any way according to the characteristic information of the session (for example, as above from a database, an XML file or a property file).

More generally, the layout markup document and the content markup documents may be identified and associated in any other way (for example, by selecting the layout markup page from multiple possibilities indicated in the content markup document according to its request, by indicating one or more content markup documents in the layout markup document, by pre-defining their association in a dedicated memory structure, or even with a single layout page for every content page).

In an embodiment, the method further comprises determining the layout elements comprised in the definition of the layout markup document, and storing an indication of the layout elements; said generating the definition of a combined markup document comprises retrieving the stored indication of the layout elements, and searching (for the stored indication of each layout element) each content element in said at least one content markup document with the content identifier matching the layout identifier of the layout element.

However, the indication of the layout elements may be stored in any way in any memory structure (for example, by simply saving their line numbers in the layout markup document). In any case, the possibility of always scanning the layout markup document directly is not excluded.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program configured for causing a computing system to perform the steps of the above-described method when the computer program is executed on the computing system.

A further embodiment provides a computer program product comprising a non-transitory computer readable medium embodying a computer program, the computer program being loadable into a working memory of a computing system thereby configuring the computing system to perform the same method.

However, the above-described solution may be implemented as a stand-alone software program, as a plug-in for a web server and/or a web browser or even directly in each one of them. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the above-described method.

However, the method may also be carried out on a system based on a different architecture (for example, a local, wide area, global, cellular or satellite network), and exploiting any type of (wired and/or wireless) connections. However, its implementation on a stand-alone computing machine is not excluded. Each computing machine may have another structure or may comprise similar elements; moreover, it is possible to replace the computing machine with any code execution entity, either based on a physical machine or a virtual machine (such as a PDA, a mobile phone, and the like), or with a combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method for managing markup documents each having a definition conforming to a pre-defined specification, the method comprising:
receiving, by a software application executing on a web server, a request to access a web site hosted on the web server;
dispatching, by the software application executing on the web server, the request to a web application executing on the web server;
retrieving, by the web application executing on the web server, a definition of a content markup document from a web page repository that maintains web pages for the web site, the definition of the content markup document comprising a set of one or more content portions each enclosed within a content element of semantically neutral type and having a corresponding content identifier;
returning, by the web application executing on the web server, the definition of the content markup document to a combiner application executing on the web server;
retrieving, by the combiner application interacting with the web application executing on the web server, a definition of a layout markup document, the definition of the layout markup document comprising a set of one or more layout elements of semantically neutral type each having a corresponding layout identifier;
generating, by the combiner application executing on the web server, a definition of a combined markup document from the definition of the layout markup document and the definition of the content markup document, wherein generating the definition of the combined markup document comprises inserting the content portion enclosed within each content element of the content markup document into the definition of the layout markup document in correspondence to each layout element with the corresponding layout identifier matching the corresponding content identifier of the content element; and
returning, by the combiner application executing on the web server, the definition of the combined markup document to the software application.

2. The method according to claim 1, wherein each markup document of the markup documents is a web page and the content markup document is identified by a metadata element in its header.

3. The method according to claim 1, wherein each content element comprises a start container tag having an attribute whose value defines the content identifier, and an end container tag, wherein each layout element is a container element having an attribute whose value defines the layout identifier.

4. The method according to claim 1, wherein the content markup document comprises two content portions having a same content identifier, and wherein inserting the content portion enclosed within each content element, for at least one of the layout elements having a plurality of content elements with the content identifier matching the layout identifier of the layout element, comprises:
appending the content portions enclosed within the content elements according to an order of the content elements within the content markup document.

5. The method according to claim 1, wherein the definition of each content markup document comprises a set of one or more further content elements of semantically meaningful type each having a corresponding further content identifier, wherein the definition of each layout markup document comprises a set of one or more further layout elements of semantically meaningful type each having a corresponding further layout identifier, and wherein generating the definition of the combined markup document comprises:
inserting each further content element of the content markup document into the definition of the layout markup document in correspondence to each further layout element of the same type with the corresponding further layout identifier matching the corresponding further content identifier of the further content element.

6. The method according to claim 1, wherein the content markup document is a single content markup document, and wherein the steps of retrieving the definition of the content markup document, retrieving the definition of the layout markup document and generating the definition of the combined markup document are performed in response to a request of the content markup document from an agent, and wherein the method further comprises:
    returning the combined markup document to the agent in response to the request of the content markup document.

7. The method according to claim 6, wherein the step of retrieving the definition of the layout markup document comprises:
    extracting an indication of the layout markup document from the definition of the content markup document.

8. The method according to claim 7, wherein the step of extracting the indication of the layout markup document from the definition of the content markup document comprises:
    extracting the indication of the layout markup document from a start metadata element which has a first attribute with a pre-defined association value and a second attribute whose value indicates the layout markup document.

9. The method according to claim 6, wherein the step of retrieving the definition of the layout markup document comprises:
    determining the layout markup document according to the request of the content markup document.

10. The method according to claim 9, wherein the step of determining the layout markup document comprises:
    extracting an indication of characteristic information of the agent from the request of the content markup document; and
    determining the layout markup document according to the characteristic information of the agent.

11. The method according to claim 9, wherein the step of determining the layout markup document comprises:
    retrieving an indication of characteristic information of a session associated with the request of the content markup document; and
    determining the layout markup document according to the characteristic information of the session.

12. The method according to claim 1, further comprising:
    determining the layout elements comprised in the definition of the layout markup document; and
    storing an indication of the layout elements, wherein the step of generating the definition of the combined markup document comprises:
    retrieving the stored indication of the layout elements; and
    for the retrieved stored indication of each layout element of the layout elements, searching for each content element in the content markup document with the corresponding content identifier that matches the corresponding layout identifier of the layout element.

13. A computer program product comprising a non-transitory computer readable medium embodying a computer program configured to cause a computing system to perform the steps of the method according to claim 1 when the computer program is executed on the computing system.

14. A system comprising a data processor coupled to a memory having instructions stored therein that are configured to perform the steps of the method according to claim 1.

15. The method according to claim 12 further comprising:
    updating a placeholder repository comprising the indication of the layout elements if the definition of the layout markup document has been updated since a last use thereof.

16. The method according to claim 15, wherein updating the placeholder repository comprises:
    scanning the layout markup document to search for potential placeholders; and
    responsive to finding a placeholder in the layout markup document, adding a corresponding layout element to an entry for the layout markup document maintained in the placeholder repository.

17. The method according to claim 16, wherein the potential placeholders comprises any HTML element with an id attribute or any metadata element with an attribute of name='placeholder' in a header of the layout markup document, or any div element with an id attribute in a body of the layout markup document.

18. The method according to claim 16, wherein the definition of the layout markup document and the definition of the content markup document each comprise a header and a body.

19. The method according to claim 18, wherein non-empty div elements are used to enclose the content portions in the body of the content markup document, and empty div elements that are each defined by a single tag and are used to define placeholders in the body of the layout markup document.

* * * * *